(12) United States Patent
Peng

(10) Patent No.: US 11,021,099 B2
(45) Date of Patent: Jun. 1, 2021

(54) TOUCH MODULE FOR VEHICLE INTERIOR TRIM AND INTERIOR TRIM COMPRISING SUCH TOUCH MODULE AND VEHICLE

(71) Applicant: FAURECIA (CHINA) HOLDING CO., LTD., Shanghai (CN)

(72) Inventor: Zixuan Peng, Shanghai (CN)

(73) Assignee: FAURECIA (CHINA) HOLDING CO., LTD., Shanghai (CN)

( * ) Notice: Subject to any disclaimer, the term of this patent is extended or adjusted under 35 U.S.C. 154(b) by 0 days.

(21) Appl. No.: 16/777,718

(22) Filed: Jan. 30, 2020

(65) Prior Publication Data

US 2020/0247316 A1 Aug. 6, 2020

(30) Foreign Application Priority Data

Feb. 1, 2019 (CN) .......................... 201910103027.6

(51) Int. Cl.
| | |
|---|---|
| *B60Q 3/80* | (2017.01) |
| *G06F 3/01* | (2006.01) |
| *G06F 3/045* | (2006.01) |
| *B60Q 9/00* | (2006.01) |
| *G06F 3/044* | (2006.01) |

(52) U.S. Cl.
CPC .................. *B60Q 3/80* (2017.02); *B60Q 9/00* (2013.01); *G06F 3/016* (2013.01); *G06F 3/044* (2013.01); *G06F 3/045* (2013.01); *G06F 2203/04102* (2013.01)

(58) Field of Classification Search
CPC .. B60Q 3/80; B60Q 9/00; G06F 3/016; G06F 3/045; G06F 3/044; G06F 2203/04102
See application file for complete search history.

(56) References Cited

U.S. PATENT DOCUMENTS

| | | | | |
|---|---|---|---|---|
| 6,371,548 B1* | 4/2002 | Misaras | .................. | B60R 13/02 |
| | | | | 296/146.7 |
| 8,377,347 B2* | 2/2013 | Sostmann | ............... | B29C 41/18 |
| | | | | 264/21 |
| 8,449,156 B2* | 5/2013 | Salter | ....................... | B60Q 3/82 |
| | | | | 362/464 |
| 8,514,545 B2* | 8/2013 | Haag | ................. | B29C 45/14811 |
| | | | | 361/280 |
| 9,531,379 B2* | 12/2016 | Dassanayake | ....... | H03K 17/955 |
| 10,562,446 B2* | 2/2020 | Cannon | .................... | B60Q 3/64 |
| 2001/0030871 A1* | 10/2001 | Anderson, Jr. | .......... | B60Q 3/82 |
| | | | | 362/488 |

(Continued)

*Primary Examiner* — Grant Sitta
(74) *Attorney, Agent, or Firm* — Reising Ethington P.C.

(57) ABSTRACT

A touch module for vehicle interior trim, including: a substrate; at least one layer of touch sensing layer disposed above the substrate, for generating a first signal upon a user's touch; a lighting layer disposed above the touch sensing layer; a decorative layer disposed above the lighting layer, at least part of the decorative layer being transparent or semi-transparent to allow light to pass through the lighting layer; and a tactile feedback layer disposed below the substrate and vibrating as a feedback according to the first signal generated by the touch sensing layer upon the user's touch. The touch module can be flexibly integrated into a vehicle interior trim such as a door, a center console, or an instrument panel to provide soft and comfortable touch feeling. An interior trim including the touch module and a vehicle having the touch module is also provided.

16 Claims, 3 Drawing Sheets

(56) References Cited

U.S. PATENT DOCUMENTS

| | | | |
|---|---|---|---|
| 2002/0101738 A1* | 8/2002 | Misaras | B60Q 3/14 362/487 |
| 2002/0121146 A1* | 9/2002 | Manaresi | G06F 3/044 73/862.68 |
| 2003/0121767 A1* | 7/2003 | Caldwell | G09F 3/204 200/512 |
| 2005/0242607 A1* | 11/2005 | Neumann | B60Q 3/64 296/39.1 |
| 2009/0108985 A1* | 4/2009 | Haag | H05K 9/0092 338/248 |
| 2010/0134431 A1* | 6/2010 | Tsai | G06F 3/0416 345/173 |
| 2010/0238053 A1* | 9/2010 | Schmidt | G06F 3/0412 341/20 |
| 2010/0250071 A1* | 9/2010 | Pala | B60K 35/00 701/48 |
| 2011/0001722 A1* | 1/2011 | Newman | G06F 3/0416 345/174 |
| 2011/0096025 A1* | 4/2011 | Slobodin | G06F 3/0446 345/174 |
| 2011/0227872 A1* | 9/2011 | Huska | H01H 13/85 345/174 |
| 2012/0161795 A1* | 6/2012 | Pfau | H03K 17/962 324/679 |
| 2014/0002405 A1* | 1/2014 | Salter | H03K 17/962 345/174 |
| 2014/0054919 A1* | 2/2014 | Oeuvrard | H01H 13/14 296/70 |
| 2014/0069015 A1* | 3/2014 | Salter | E05B 81/76 49/31 |
| 2015/0015808 A1* | 1/2015 | Rasmussen | G06F 1/16 349/12 |
| 2015/0116231 A1* | 4/2015 | Kim | G06F 3/016 345/173 |
| 2015/0185946 A1* | 7/2015 | Fourie | G06F 3/04166 345/174 |
| 2015/0229305 A1* | 8/2015 | Buttolo | B60R 16/02 307/9.1 |
| 2015/0234493 A1* | 8/2015 | Parivar | G06F 3/0486 345/174 |
| 2016/0004362 A1* | 1/2016 | Kring | B60N 2/0228 345/174 |
| 2017/0210275 A1* | 7/2017 | Kubo | B60R 13/02 |
| 2017/0217366 A1* | 8/2017 | Kraemer | B60Q 3/14 |
| 2017/0305453 A1* | 10/2017 | Nishio | B62D 1/046 |
| 2017/0344155 A1* | 11/2017 | Lee | G06F 3/0446 |
| 2017/0364183 A1* | 12/2017 | Xiao | G06F 3/0416 |
| 2018/0150153 A1* | 5/2018 | Yoon | G06F 3/0446 |
| 2018/0272663 A1* | 9/2018 | Mani | B32B 25/045 |
| 2019/0012032 A1* | 1/2019 | Brandao Salgado | G06F 3/041 |
| 2019/0012033 A1* | 1/2019 | Brandao Salgado | B32B 17/10036 |
| 2019/0051711 A1* | 2/2019 | Lee | H01L 27/3272 |
| 2019/0225143 A1* | 7/2019 | Severinski | B60N 2/58 |
| 2019/0283371 A1* | 9/2019 | Bande | B32B 27/322 |
| 2019/0385491 A1* | 12/2019 | Xu | G09F 9/30 |
| 2020/0346428 A1* | 11/2020 | Juenemann | B32B 3/30 |

* cited by examiner

TOUCH MODULE FOR VEHICLE INTERIOR TRIM AND INTERIOR TRIM COMPRISING SUCH TOUCH MODULE AND VEHICLE

TECHNICAL FIELD

The invention relates to a touch module for vehicle interior trim and an interior trim comprising such touch module and a vehicle.

BACKGROUND

Human-computer interaction between a vehicle and a user is usually realized through buttons and/or knobs on a control panel. However, such physical input devices are usually made of plastic, which oxidize slowly with the increase of the time of contacting with air, resulting in a poor hand feeling and a dark color which impacts on its appearance.

With the gradual development of touch technology and the popularization of touch screen, it has become a trend to replace the traditional buttons and/or knobs with touch screens.

However, only relying on the touch screen on the control panel to control all the electronic devices in the vehicle will lead to confusion of user's memory, and it is difficult to fully remember and master the control methods of all the electronic devices.

Moreover, the touch screen has a cold and hard hand feeling, so it is difficult for users to have a pleasant mood when operating such touch screen.

In addition, what bothers users even more is that when operating such cold and hard touch screens, users cannot get feedback directly, and it is difficult to confirm whether its operation has taken effect or not. In an environment of such phenomenon for a long time, it is easy to cause user's illusion, and even lead to driver's self-cognition disorder and affect the normal driving.

SUMMARY

It is worth noting that a purpose of the present invention is to overcome one or more shortcomings that have been found in the prior art.

For this purpose, according to one aspect of the invention, a touch module for vehicle interior trim is proposed, which may be realized through the following technical scheme.

The touch module for vehicle interior trim may include:
a substrate,
at least one layer of touch sensing layer disposed above the substrate, for generating a first signal upon a user's touch,
a lighting layer disposed above the touch sensing layer,
a decorative layer disposed above the lighting layer, at least part of the decorative layer is transparent or semi-transparent to allow light to pass through the lighting layer,
wherein it further includes:
a tactile feedback layer disposed below the substrate and vibrating as a feedback according to the first signal generated by the touch sensing layer upon the user's touch.

The touch module integrates touch sensing, light feedback and physical feedback, and effectively solves the defect that users cannot get feedback when operating the vehicle touch screen. Especially for drivers, they need to pay attention to the road conditions at all times, so drivers may ignore the light feedback because they need to pay attention to the road conditions, while the physical feedback can ensure that drivers can get the feedback quickly and efficiently.

The touch module can also be integrated into different parts of the vehicle, which makes the adjustment function of different parts more intuitive. Users do not need to memorize all kinds of tedious operation methods, for example, the adjustment of the window can be realized by a touch module directly integrated into the door at a position close to the window, the adjustment of the seat can be realized by a touch module directly integrated into one side of the seat, or It is realized by a touch module integrated into the center console.

In different embodiments, the touch module may have on one and/or more of the following configurations.

In one embodiment, it includes a processing unit electrically connected to at least one electrical element for a vehicle and controlling the at least one electrical element according to the received first signal generated by the touch sensing layer.

Further, the lighting layer electrically coupled with the processing unit, and the processing unit controls the lighting layer according to the received first signal generated by the touch sensing layer.

Further, the tactile feedback layer electrically coupled with the processing unit, and the processing unit controls the tactile feedback layer according to the received first signal generated by the touch sensing layer.

In one embodiment, it further includes a layer of foam disposed above or below the touch sensing layer.

In one embodiment, the touch sensing layer includes a first touch sensing layer and a second touch sensing layer, and a layer of foam disposed between the first touch sensing layer and the second touch sensing layer.

In one embodiment, the tactile feedback layer includes a vibration motor.

In one embodiment, the touch sensing layer includes at least one touch sensor selected among a capacitive or a resistive touch sensor or a carbon nano film.

In one embodiment, the decorative layer is leather or textile with light transmission performance, such material has a soft and comfortable hand feeling.

In one embodiment, the decorative layer has decorative button(s).

In one embodiment, the touch sensing layer is flexible.

According to another aspect of the invention, an interior trim for a vehicle, including a touch module for vehicle interior trim according to any one of the above touch modules is proposed, such interior trim may be a door, a center console or an instrument panel.

According to another aspect of the invention, a vehicle including a touch module for vehicle interior trim according to any one of the above touch modules is proposed.

BRIEF DESCRIPTION OF THE DRAWINGS

It should be understood that in the present invention, all features, deformations and/or specific embodiments may be combined in accordance with a variety of combinations, except in cases of apparent contradiction or incompatibility.

Other features and advantages of the invention will be apparent by reading the following specific embodiment as a non-limiting description and in combination with the accompanying drawings, in which.

DETAILED DESCRIPTION OF THE ILLUSTRATED EMBODIMENTS

It should be understood that the above drawings are not in real scale, but are only diagrams for explaining a variety of preferred features of the basic principles of the invention. The design features such as size, direction, position and shape are determined according to specific application and use environment.

Embodiments of the invention will be described in detail below in combination with drawings. In these drawings, the same reference number refers to the same or equivalent element in all drawings.

Figure 1:
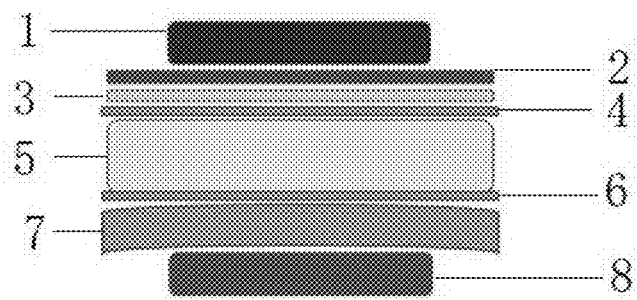
FIG. 1 is a structural sectional view showing a touch module according to a first embodiment of the present invention.

FIG. 1 shows the structural sectional view of the touch module according to the first embodiment of the invention. The touch module comprises a substrate 7, a tactile feedback layer 8 arranged below the substrate 7, two touch sensing layers 4; 6 arranged above the substrate 7, the two touch sensing layers 4; 6 are respectively supported on each side of a layer of foam 5, and a lighting layer 3 and a decorative layer 2 arranged above the touch sensing layers 4; 6. Decorative button(s) 1 can be selectively arranged on the decorative layer 2.

The substrate 7 is used to form the support body of the touch module, which is made of plastic, wood or synthetic materials, with a thickness between 1 mm and 5 mm, preferably 2 mm. As appropriate, the substrate 7 may be integrated into the basic frame body of an interior trim.

The touch sensing layers 4; 6 include a first touch sensing layer 4 and a second touch sensing layer 6, the thickness of the first touch sensing layer 4 is between 0.5 mm and 2 mm, preferably 1 mm; the thickness of the second touch sensing layer 6 is between 0.5 mm and 2 mm, preferably 1 mm. Touch sensing layers 4; 6 can be capacitive sensors, piezoelectric sensors, resistance sensors or infrared sensors. Capacitor touch sensors are preferred.

The touch sensing layers 4; 6 are adapted to generate a first signal $t_1$ upon the touch of the user.

The touch sensing layers 4; 6 are flexible, preferably, and can also be a 3D plastic and scalable film made of carbon nano, such as CNB™ film.

The layer of foam 5 is flexible, between the first touch sensing layer 4 and the second touch sensing layer 6, with a thickness between 2.5 mm and 10 mm, preferably 5 mm. As appropriate, the layer of foam 5 may be integrated into a foam layer, a sponge layer or other flexible buffer material layer of an interior trim.

The lighting layer 3 includes a light source, which can be a light-emitting diode, a light conduit, an incandescent bulb, an electroluminescent lamp, a light-emitting polymer, a fluorescent lamp, an optical fiber braid layer and a flexible LED light-emitting module, and the like. The thickness of the lighting layer 3 is between 1.5 mm and 5 mm, preferably 3 mm, and can emit light of different colors, and can emit light of different colors according to the types of the first signal $t_1$.

As appropriate, the lighting layer can be made to be flexible.

The decorative layer 2 is arranged on the lighting layer 3, and the decorative layer 2 is at least partially transparent or semi-transparent so as to allow light pass through the lighting layer 3. The decorative layer 2 can be the outer surface layer of a vehicle interior trim, which is usually made of leather or woven fabric and other materials with flexibility, so as to make the passengers feel comfortable and soft when touching it. Its thickness is between 0.5 mm and 2 mm, preferably 1 mm.

Then, the decorative layer 2, the lighting layer 3, the touch sensing layers 4; 6 and the layer of foam 5 are all flexible, suitable for fitting various interior trim parts with different contours, so they have wide applicability and plasticity.

Optionally, the decorative layer 2 has decorative button(s) 1, and has a transparent or semi-transparent opening. The decorative button(s) 1 can be set to different shapes according to different electronic components to be controlled. And a corresponding number of decorative buttons can be set according to the number of electrical elements to be controlled, preferably arranged in the form of an array.

Optionally, the decorative layer 2 has a 3D plastic convex or concave shape, and has a transparent or semi-transparent opening. The 3D plastic convex shape can be set to different shapes according to the different electronic components to be controlled.

The tactile feedback layer 8 may include a vibration motor, the tactile feedback layer 8 is arranged under the substrate 7, and vibration feedback is activated upon user's touch according to the first signal $t_1$ generated by the touch sensing layers 4; 6. For example, the vibration motor is fixed to the bottom of the substrate 7 by fasteners, or is connected to the bottom of the substrate 7 by other supports, optionally, elements such as washers can be arranged between the two.

Figure 5:
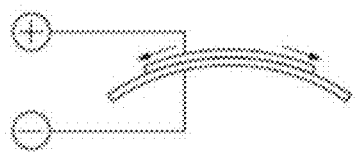
FIG. 5 is a schematic diagram of an example of a tactile feedback layer of touch modules of FIGS. 1 and 4.

In another variant, the tactile feedback layer 8 may utilize piezoelectric effects, as shown in FIG. 5. The piezoelectric bending element is placed under the substrate 7. When the piezoelectric bending element is vibrated by a high voltage, the surface will move up and down at the same time. It is also able to simulate the click of a button by shrinking the surface. The principle is to bond a large piece of piezoelectric bending element to a stainless-steel sheet, since the stainless-steel sheet has a strong in-plane stiffness, by applying high voltage to the piezoelectric element, the contraction of the piezoelectric bending element will cause the stainless-steel sheet to sink to one side, producing a click experience similar to a light touch switch at the fingertip.

In addition, the touch module can provide the lighting layer 3 or the tactile feedback layer 8 with different functions according to the changes of the tactile feedback layer 8 by software programs.

In another example, the touch module also includes a processing unit. The processing unit is adapted to electrically connect at least one electrical element for the vehicle and operate said at least one electrical element according to the received first signal sent by the touch sensing layers 4; 6. Such electrical elements may be, for example, windows, seats, ambient lights, ventilation systems, etc.

In this case, the touch sensing layers 4; 6 can also generate a second signal $t_2$ according to a release touch of the user, and the processing unit determines user's touch time $t=t2-t1$. If t is less than a predetermined time $t_s$, no function of the lighting layer 3 or the touch feedback layer 8 will be triggered, so as to realize a function of preventing unintended touch. If t is greater than or equal to the predetermined time $t_s$, then a touch signal is issued to trigger the functions of the lighting layer 3 and/or the touch feedback layer 8.

In addition, the touch signal may also include a position parameter, for example, the touch sensing layers 4; 6 include a horizontal coordinate and a longitudinal coordinate represented by a coordinate system (x, y), when the user touches the decorative layer 2, a specific coordinate of the touch sensing layers 4; 6 under the touched surface will be activated, the touch sensing layers 4; 6 will transmit the specific coordinate to the processing unit together with the first signal $t_1$ and the second signal $t_2$ for further processing.

In this case, the lighting layer 3 is electrically coupled with the processing unit, and the processing unit controls the lighting layer 3 to select the color, brightness, frequency, duration, etc. of the light to be emitted according to the received first signal and/or touch signal sent by the touch sensing layers 4; 6.

As a variant, the touch module may also have no substrate 7, in this case, there is no intermediary medium between the tactile feedback layer 8 and the second touch sensing layer 6.

Figure 2:
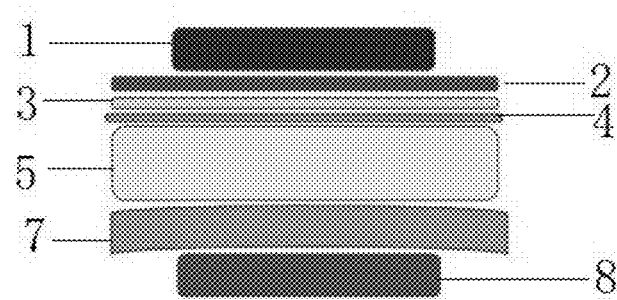
FIG. 2 is a structural sectional view of a variant of the touch module of FIG. 1.

As another variant, the touch sensing layer only includes a first touch sensing layer 4 located above the layer of foam 5, as shown in FIG. 2.

Figure 3:
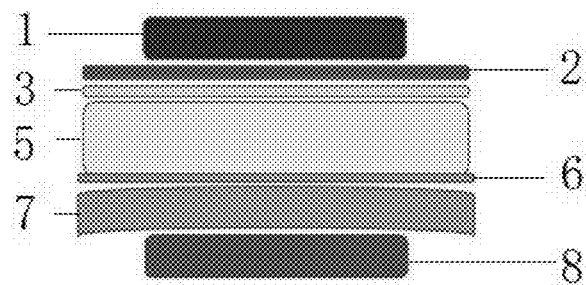
FIG. 3 is a structural sectional view of another variant of the touch module of FIG. 1.

As another variant, the touch sensing layer only includes a second touch sensing layer 6 located below the layer of foam 5, as shown in FIG. 3.

Figure 4:
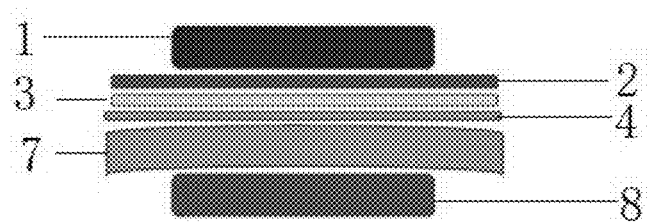
FIG. 4 is a structural sectional view showing a touch module according to a second embodiment of the present invention.

FIG. 4 shows a structural sectional view of a touch module according to the second embodiment of the present invention, which comprises a substrate 7, a tactile feedback layer 8 arranged below the substrate 7, a touch sensing layer 4 arranged above the substrate 7, a lighting layer 3 and a decorative layer 2 arranged above the touch sensing layer 4, and decorative button(s) 1 selectively arranged above the decorative layer 2. The difference between the touch module of the second embodiment and the touch module of the first embodiment is that it does not include the layer of foam 5 and the second touch sensing layer 6, so its hand feeling is slightly poor, but the price is cheaper, and it is suitable for economic models.

The variant of the touch module of the first embodiment and the variant of the above examples are also applicable to the touch module of the second embodiment.

Figure 6:
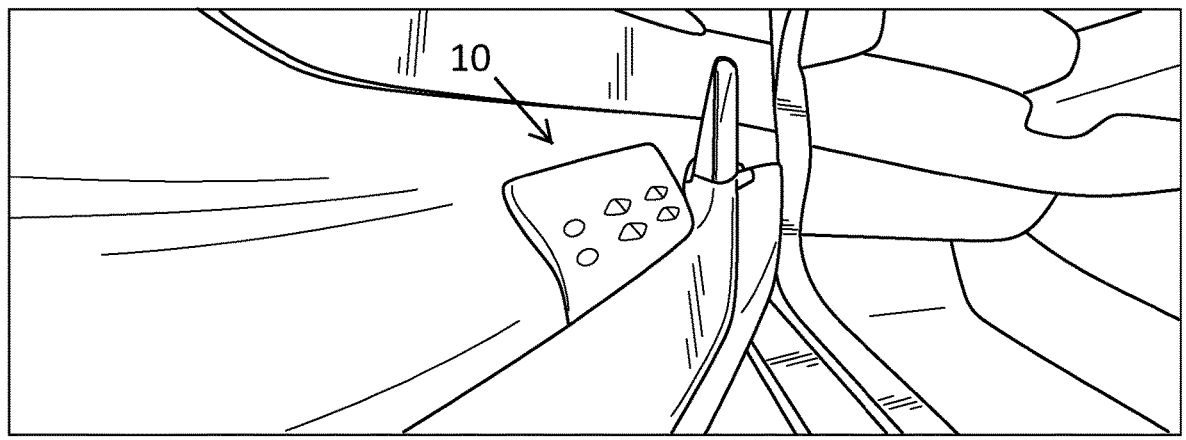
FIG. 6 is a schematic diagram of a door with a touch module.
Figure 7:
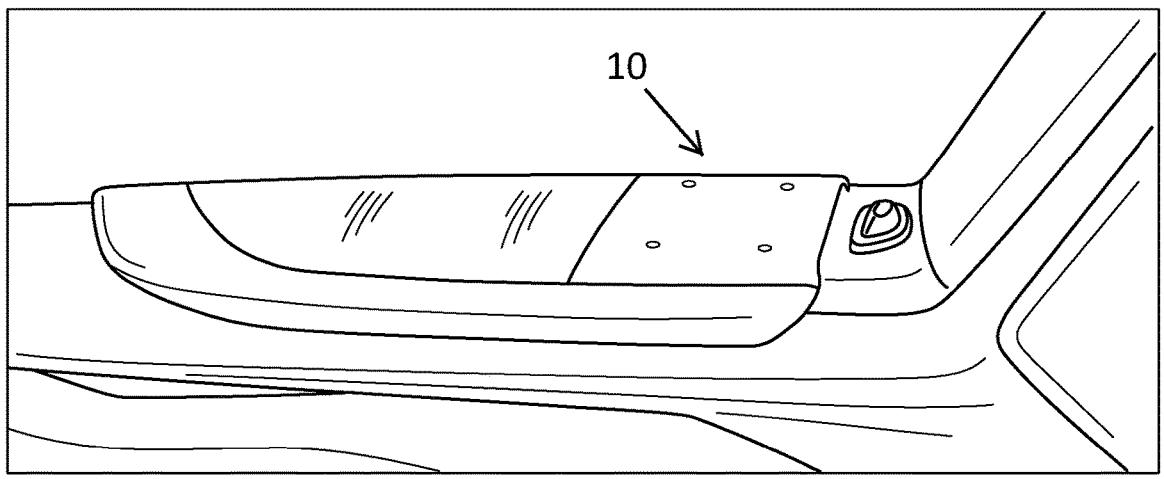
FIG. 7 is a schematic diagram of a center console for a vehicle with a touch module.

Another aspect of the invention relates to an interior trim comprising a touch module 10 for vehicle interior trim as described in any of the above mentioned. The touch module 10 can be flexibly applied to an instrument panel, a door (as shown in FIG. 6), a center console (as shown in FIG. 7), an armrest and a seat.

Another aspect of the invention also relates to a vehicle, which includes a touch module for vehicle interior as described in any of the above mentioned. The touch module can be flexibly applied to an instrument panel, a door (as shown in FIG. 6), a center console (as shown in FIG. 7), an armrest and a seat.

The above embodiments are only examples and do not limit the scope of the invention. On this basis, those skilled in the art can envision other embodiments that can realize the same function within the scope of the protection of the claims of the invention.

Those skilled in the art master a variety of embodiments and a variety of variants and improvements. In particular, it should be clear that, in addition to obvious contradictions or incompatibilities, the above features, variants and/or specific embodiments of the invention can be combined with each other. All these embodiments, variants and improvements belong to the protection scope of the invention.

The invention claimed is:

1. A touch module for vehicle interior trim, including:
   a substrate,
   at least one touch sensing layer disposed above the substrate, for generating a first signal upon a user's touch,
   a lighting layer disposed above the touch sensing layer,
   a decorative outer surface layer disposed above the lighting layer, wherein the decorative layer is leather or a textile and has a transparent or semi-transparent opening to allow light to pass through the decorative layer,
   a layer of foam disposed above the touch sensing layer,
   a tactile feedback layer disposed below the substrate and vibrating as a feedback according to the first signal generated by the touch sensing layer upon the user's touch, and
   a processing unit electrically connected to at least one electrical element for a vehicle and controlling the at least one electrical element according to the received first signal generated by the touch sensing layer,
   wherein the tactile feedback layer is electrically coupled with the processing unit, and wherein the processing unit controls the tactile feedback layer according to the received first signal generated by the touch sensing layer.

2. The touch module according to claim 1, wherein the lighting layer is electrically coupled with the processing unit, and wherein the processing unit controls the lighting layer according to the received first signal generated by the touch sensing layer.

3. The touch module according to claim 1, wherein the touch sensing layer includes a first touch sensing layer, and the layer of foam is disposed between the first touch sensing layer and a second touch sensing layer.

4. The touch module according to claim 1, wherein the tactile feedback layer includes a vibration motor.

5. The touch module according to claim 1, wherein the touch sensing layer includes at least one touch sensor selected among a capacitive or a resistive touch sensor or a carbon nano film.

6. The touch module according to claim 1, wherein the decorative layer has one or more decorative buttons.

7. The touch module according to claim 1, wherein the touch sensing layer is flexible.

8. An interior trim for a vehicle, including a touch module for vehicle interior trim according to claim 1.

9. A vehicle including a touch module for vehicle interior trim according to claim 1.

10. The touch module according to claim 1, wherein the layer of foam has a thickness between 2.5 millimeters and 10 millimeters.

11. The touch module according to claim 1, wherein the at least one touch sensing layer has a thickness between 0.5 millimeters and 2 millimeters.

12. The touch module according to claim 1, wherein the decorative layer has one or more decorative buttons each in the form of protrusions along the decorative layer.

13. The touch module according to claim 1, wherein the decorative layer has one or more decorative buttons, and the transparent or semi-transparent opening is at one of the decorative buttons.

14. The touch module according to claim 1, wherein the decorative layer has a plurality of decorative buttons each having a different shape and configured to control a corresponding plurality of different electrical elements of the vehicle.

16. The touch module according to claim 1, wherein the decorative layer has a 3D convex or concave shape and the transparent or semi-transparent opening is at said convex or concave shape.

16. The touch module according to claim 1, wherein said at least one touch sensing layer includes only one touch sensing layer above the substrate.

\* \* \* \* \*